United States Patent
Pollock

[11] Patent Number: 5,513,597
[45] Date of Patent: May 7, 1996

[54] FEED CONVEYING APPARATUS

[75] Inventor: Eugene B. Pollock, Shelby County, Ill.

[73] Assignee: Grain Systems, Inc., Assumption, Ill.

[21] Appl. No.: 329,481

[22] Filed: Oct. 26, 1994

Related U.S. Application Data

[60] Continuation-in-part of Ser. No. 154,612, Nov. 18, 1993, abandoned, which is a division of Ser. No. 5,905, Jan. 15, 1993, Pat. No. 5,335,619.

[51] Int. Cl.⁶ ..................................................... A01K 5/02
[52] U.S. Cl. ....................................................... 119/57.4
[58] Field of Search ......................... 119/57, 57.1, 57.2, 119/57.3, 57.4, 56.1, 56.2, 52.1, 53; 198/671, 670; 414/326; 222/410, 411, 412, 413; 239/675

[56] References Cited

U.S. PATENT DOCUMENTS

| | | | |
|---|---|---|---|
| 1,954,703 | 4/1934 | Klein | 214/17 |
| 2,646,023 | 7/1953 | Virgil | 119/52 |
| 3,187,958 | 6/1965 | Swart | 222/227 |
| 3,199,493 | 8/1965 | Hart | 119/57.2 X |
| 3,230,933 | 1/1966 | Myers et al. | 119/53 |
| 3,270,857 | 9/1966 | Wilkes et al. | 198/64 |
| 3,292,585 | 12/1966 | Buschbom | 119/52 |
| 3,357,540 | 12/1967 | Lippi | 198/64 |
| 3,394,681 | 7/1968 | Rigterink et al. | 119/52 |
| 3,415,228 | 12/1968 | Myers | 119/51.11 |
| 3,561,403 | 2/1971 | Wilson, Jr. | 119/51.11 |
| 3,598,087 | 10/1971 | Ramser | 119/56 |
| 3,773,220 | 11/1973 | Morgan | 222/48 |
| 3,776,191 | 12/1973 | Murto | 119/57.3 X |
| 3,971,340 | 7/1976 | Allen | 119/52 |
| 4,003,339 | 1/1977 | Hostetler | 119/52 |
| 4,089,300 | 5/1978 | Keen et al. | 119/52 |
| 4,220,434 | 9/1980 | Letzig | 414/326 |
| 4,611,921 | 9/1986 | Patel | 366/156 |
| 4,640,230 | 2/1987 | VanRooijen | 119/52 |
| 4,850,307 | 7/1989 | Sheets | 119/51 |
| 5,335,619 | 8/1994 | Pollock | 119/57.4 |

FOREIGN PATENT DOCUMENTS

1411643 10/1964 France.

*Primary Examiner*—Thomas Price
*Attorney, Agent, or Firm*—Polster, Lieder, Woodruff & Lucchesi

[57] ABSTRACT

A feed conveying apparatus is disclosed for use in a poultry or livestock feeding system (503). The feed conveying apparatus has a housing (509) having a feed inlet (515) which receives feed from, a feed supply (BFT) and a feed outlet (517). A feed conveyor (508) extends through the housing. The conveyor has a conveyor tube (511) with a feed auger (513) therein. The feed auger has a multiplicity of substantially equally spaced flights (62) and is driven within the conveyor tube for picking up feed from the housing and for conveying it through the conveyor tube. A regulator (521) is provided for regulating the amount of feed within the conveyor tube downstream from the housing to an amount less than will totally fill the conveyor tube so as to form a partial void (V) within the conveyor tube and to prevent overcompaction of the feed within the conveyor tube. In addition, an agitator (519) is provided for positively removing feed from between the flights of the auger so as to positively insure that the amount of feed carried by the auger is less than the full amount of the feed that would be carried by the auger even after it passes through restrictor sleeve (521) thus preventing filling of the open trough feeders to a level greater than a desired feed level.

9 Claims, 9 Drawing Sheets

FEED CONVEYING APPARATUS

CROSS REFERENCE TO A RELATED APPLICATION

This is a continuation-in-part application of U.S. patent application Ser. No. 08/154,612 filed Nov. 18, 1993, now abandoned which is a division of U.S. patent application Ser. No. 08/005,905 filed Jan. 15, 1993, now U.S. Pat. No. 5,335,619 issued Aug. 19, 1994.

BACKGROUND OF THE INVENTION

This invention relates to animal or poultry feeding systems in which a pulverant, fluent feed is conveyed to a series of feeding stations where it is dispensed for chickens (or other animals or birds) to eat, and, more particularly, to a feed intake unit to which the feedstock is delivered and from which it is conveyed.

Poultry feeding systems are well-known in the art. See, for example, U.S. Pat. Nos. 4,850,307; 4,640,230; 4,003,339; 3,971,340; 3,598,087; 3,415,228; and 3,230,933. As shown in these representative patents, feedstock from a bulk feed tank or the like is delivered to an intake cup or hopper. From the hopper, the feed is delivered to a conveyor which services a number of feeding stations. In large poultry houses, one of these conveyors may have a length of up to 400 feet and there may be 200–300 or so of the feeding stations. The feed is conveyed, usually by means of an auger received in a feed conveyor tube extending through each of the feed stations. The auger may either be rotary driven or axially propelled within the tube to convey the feed from the intake cup and from feeder to feeder. Feed is deposited from the conveyor into feed pans of the feeders located at each station for subsequent consumption by the birds.

It is a problem with present feeding systems that they can become overloaded and jammed up with feed. This situation is likely to occur, for example, when the feeders are full. Then a substantial amount of feed is retained in the conveyor loop. At the same time, additional feed is being dispensed from the hopper into the conveyor. When that happens, the pressures created compact the feed in the conveyor loop until all void spaces are filled or packed. The resultant pressures eventually cause the auger to jam and stop moving. For example, in certain of the prior art feeding systems (such as shown in U.S. Pat. No. 4,850,307), it is a feature of these systems that voids are intentionally formed in the feed intake cup so as to prevent the flights of the auger from becoming overfilled with feed. However, it has been found that if no feed is being dispensed to the feed stations and as the conveyor is run continuously, these voids tend to become overfilled as more feed is delivered to the auger. The feed at the inlet to the conveyor is also compacted, as is the feed above it. In this latter regard, even if the feed at the inlet to the conveyor is broken up, the compacted feed above it may create a solid bridge preventing any feed from reaching the conveyor from the hopper.

If the further delivery of feed to the conveyor system ultimately jams the auger, the conveyor feed tube must be disassembled, the compacted feed cleaned out, and everything then reassembled. The feed intake to the conveyor must also be cleaned out to break up deposits of compacted feed. This is not only a time consuming and expensive process, but it means the poultry is either not fed, or must be fed by hand or in some other manner during the down time.

Figure 1:
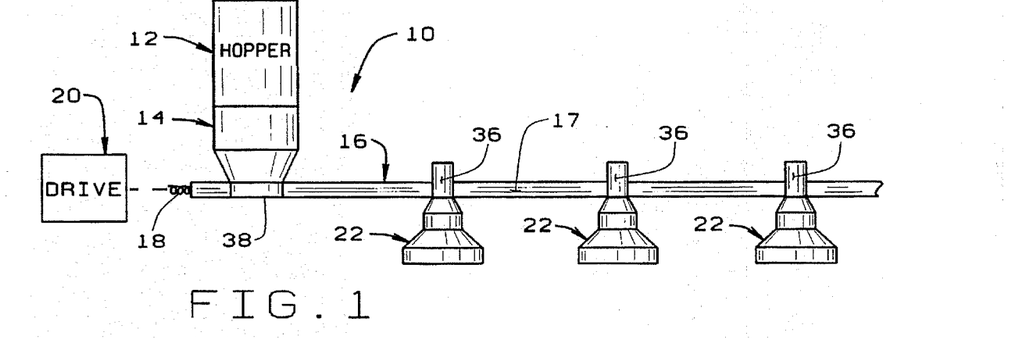
FIG. 1 is a representation of a portion of a poultry feed delivery system with which the intake cup of the present invention is used.
Figure 17:
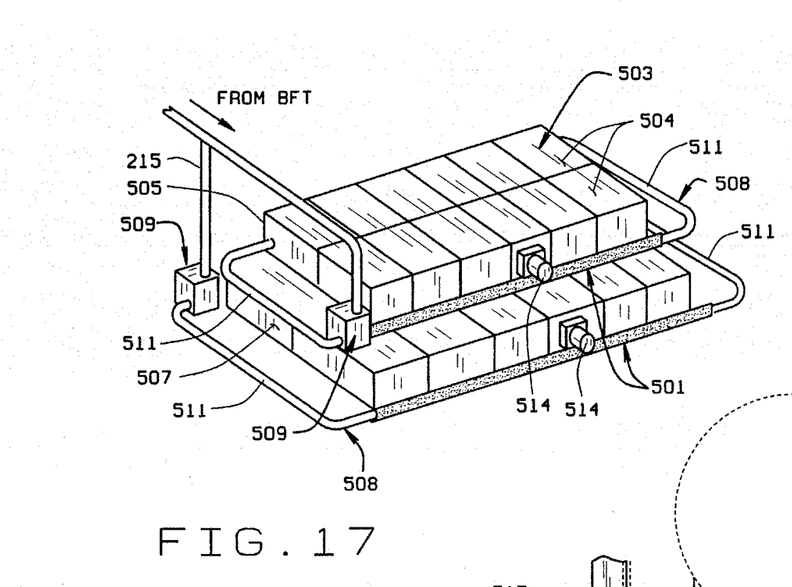
FIG. 17 illustrates an open trough feeder for a cage poultry system in which a feed conveyor of the present invention supplies feed thereto from a remote feed hopper (as illustrated in FIG. 15) to multiple trough feeders successively supplied with feed by the feed conveyor with the feed conveyor having means for preventing overfilling of the trough feeders and for insuring that a uniform quantity of feed is delivered to each of the trough feeders.

It has been further found that in poultry cage systems, such as where laying hens are housed in cages (as illustrated in FIG. 17) and are supplied feed by means of a trough feeder rather than the pan feeders as shown in FIG. 1, and where one conveyor supplies feed to more than one trough feeder, operation of the feed conveyor may result in unequal amounts of feed in the feeders. As a result of this unequal feed distribution in the feeders, the birds supplied by one of the feeders may receive excess feed while the birds the other feeder may not receive sufficient feed which may result in different egg production rates. Further, in prior art trough feeder systems, continued operation of the feed conveyor would oftentimes result in increasing quantities of feed being deposited in increasing quantities of feed being deposited in each of the feeders such that too much feed would be presented to at least some of the birds which could result in overfeeding or in waste of the feed. Also, continued operation of the conveyor could result in overcompaction and jamming of the conveyor.

It has been found that differences in feed characteristics (i.e., the flowability and angle of repose of the feed mix being used) may have a significant effect of prior art poultry feed conveying systems jamming in the manner as above described.

SUMMARY OF THE INVENTION

Among the several objects of the present invention may be noted the provision of a feed intake cup for use in a poultry feeder system;

The provision of such an intake cup for delivering feed from a hopper or the like to a conveyor by which the feed is conveyed to a plurality of feeding sites serviced by the conveyor;

The provision of such a conveyor system to use an auger for moving the feed between the intake and the stations;

The provision of an intake cup for delivering feed to the conveyor, the intake including mechanisms for preventing overfilling with subsequent compaction of the feed line and consequent jamming of the system;

The provision of such mechanisms to simply and easily prevent compaction of feed;

The provision of such a mechanism to act cooperatively with the auger as it moves through the cup to vibrate, shake, agitate, stir, churn, flail, or otherwise jostle the feed in the cup and the conveyor as the auger moves, so as to prevent the feed from compacting within the cup;

The provision of such a mechanism to not damage the cup or auger or otherwise interfere with the delivery of feed;

The provision of such a mechanism to also regulate the feed level and to positively displace feed from the auger if it is full thereby to reduce the possibility of a jam;

The provision of such an intake cup which permits the auger to be driven without undue packing of the feed in the conveyor once the feed stations are filled thereby to insure, upon startup of the conveyor, that feed is delivered substantially simultaneously to all of the feed stations;

The provision of such an intake cup having an associated dual diameter tube through which the auger is driven, the tube design preventing excess feed from over filling the auger or conveyor;

The provision of such a dual diameter tube that serves to regulate the feed with no moving parts;

The provision of such a feed conveying system in which enable successive trough feeds supplied by a common feed conveyor to be filled to a uniform depth of feed without overfilling of the troughs upon continued operation of the conveyor;

The provision of such an intake cup in which the mechanism for producing the agitation, stirring, or jostling is readily installed; and, The provision of such an intake cup which is usable with existing feed conveyor systems.

In accordance with the invention, generally stated, a feed intake cup of the present invention is provided for use in a poultry feeding or livestock feeding system. The apparatus comprises housing having a feed inlet which receives feed from a feed supply and a feed outlet. The housing has a body which generally converges downwardly and inwardly from the feed inlet toward the feed outlet, and a feed conveyor extending through the housing. The feed conveyor comprises a conveyor tube with a feed auger therein. The feed auger has a multiplicity of substantially equally spaced flights and is driven within the conveyor tube for picking up feed from the housing and for conveying it through the conveyor tube. Means is provided for regulating the amount of feed within the conveyor tube downstream from the housing to an amount less than will totally fill the conveyor tube so as to form a partial void within the conveyor tube and to prevent overcompaction of the feed within the conveyor tube.

BRIEF DESCRIPTION OF THE DRAWINGS

Corresponding reference characters indicate corresponding parts throughout the drawings.

DESCRIPTION OF PREFERRED EMBODIMENTS

Figure 14:
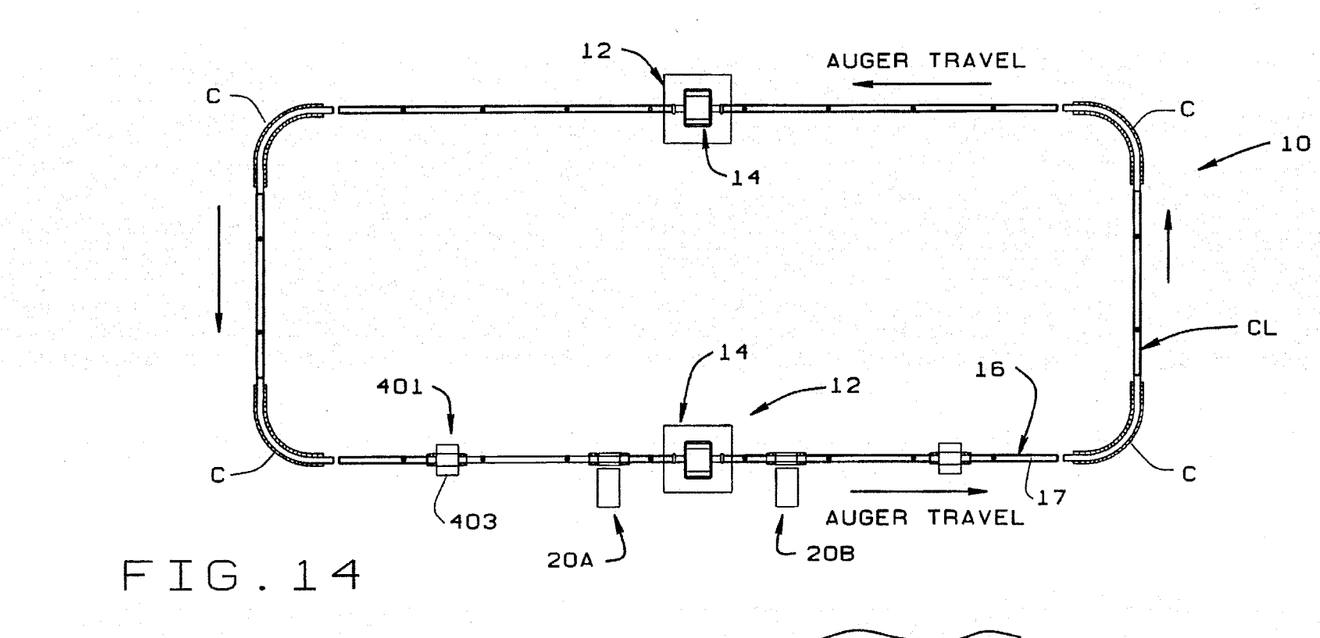
FIG. 14 is a semi-diagrammatic view of a feed delivery and feeder system using multiple conveyor drives and multiple feed intake cups of the present invention.

Referring to the drawings, a poultry feeding system is indicated generally 10 in FIGS. 1 and 14. System 10 includes a hopper 12 into which feed is received from a bulk feed tank BFT or the like (see FIG. 15). From hopper 12, the feed gravitates (falls) into an intake or hopper unloader cup 14 which comprises the present invention and which is described in detail hereinafter. From cup 14, the feed enters a conveyor 16. The latter includes a conveyor tube 17 in which an auger 18 is located. Preferably, auger 18 is a centerless auger having the appearance of a stretched out coil spring. Auger 18 driven by a drive mechanism 20 to cause the feed to be transferred by conveyor 16 to one or more feed stations 22. Auger 18 may be rotatably or linearly driven by the drive mechanism. Auger 18 may be linearly propelled through tube 17 by means of a drive gear having gear teeth in mesh with the flight of the auger. Such a drive is described in U.S. Pat. No. 4,460,230.

Alternatively, the auger maybe rotary driven within the conveyor tube such that the auger acts like a screw to convey the feed through the conveyor tube. Still other well-known feed conveyors (e.g., a chain conveyor) may be used. As shown in FIG. 14, when auger 19 is linearly propelled, conveyor 16 may be an endless closed track system in which the conveyor 16 is arranged in a closed loop configuration around the poultry house. As shown in FIG. 14, additional drive mechanisms 20 and additional intake feed cups 14 may be located along the loop to facilitate movement of feed to the various feeders 22.

In delivering feed to feeders 22, one problem which is encountered is feed compaction. Compaction is usually caused by an over abundance of feed being conveyed through the system. If, for example, feed currently in the conveyor is not deposited at a station because the feed already there has not been consumed, excess feed in the conveyor will be circulated back to cup 14. At the same time, additional feed flows from hopper 12 into cup 14 for entry into the conveyor. Since the flow of feed through the cup is by gravity, the feed will exert a substantial amount of "hydrostatic" pressure on the feed so as to pack even more feed into the feed conveyor. And, since the excess feed in the conveyor is being constantly recirculated throughout the feed loop, rather than deposited at the stations, it often becomes more and more compacted until jamming occurs. If the conveying system gets jammed, it must be disassembled by removing the auger from the conveyor tube, the compacted feed cleaned out, and the system then reassembled. This creates a time consuming and expensive delay especially considering the number of birds fed by the system, and the amount of wasted feed which is created by the jam. Intake cup 14 of the present invention alleviates feed compaction, and thus eliminates the attendant time delay and cost.

Figure 2:
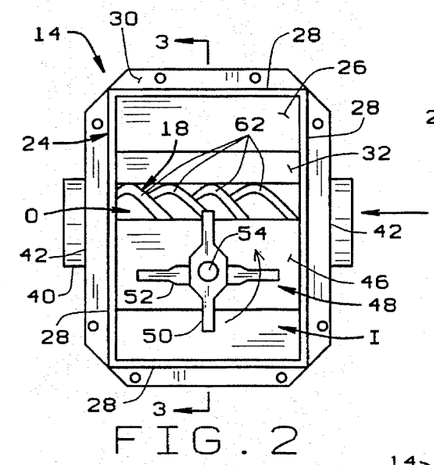
FIG. 2 is a top plan view of the cup with a paddle or stirring assembly used in a first embodiment of the invention.
Figure 3A:
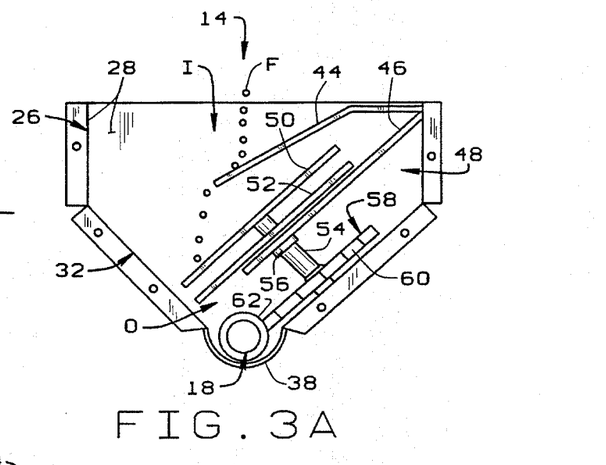
FIG. 3A is a sectional view of the cup taken along line 3—3 in FIG. 2.

In FIGS. 2 and 3A, a first embodiment of the intake cup is shown to include a housing 24. The housing has a generally rectangular upper end 26 the side walls 28 of which define a feed inlet I. Respective flanges 30 are formed at the upper end of each side wall for attachment of the intake to the bottom or outlet end of hopper 12. It will be appreciated that feed may be supplied to cup 14 by means other than hopper 14. For example, feed may be supplied by means of a suitable drop tube (not shown). Side walls 28 of housing 24 also have a lower tapered section 32 for the lower end of the housing to define an outlet O into which feed flows from the intake cup 14 into conveyor 16.

Figure 9:
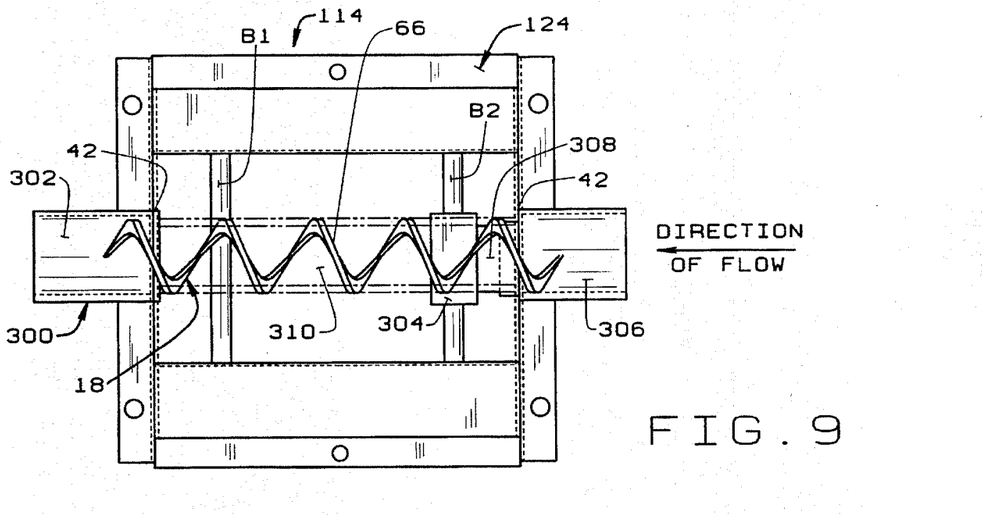
FIG. 9 is a plan view of the cup housing with a multiple diameter regulator tube of the invention installed.

Feed conveyor 16 is connected to housing outlet O for the feed flowing through the housing to flow into the conveyor. The conveyor includes conveyor tube 17 having an inlet end at the outlet of the housing and a series of spaced outlets 36, one at each feed station 22. The lower end of section 32 of housing 24 has a rounded semi-cylindrical base portion, as indicated at 38 in FIG. 3A. In addition to helping to define outlet O of the intake cup, base portion 38 also provides a housing for auger 18. The auger moves rotatably in or linearly through housing section 38 for conveying feed falling from the hopper to be delivered to the conveyor and to be distributed to the outlets 36. Alternately, and as described hereinafter, a multiple diameter tube 40, see FIGS. 9–11, may be installed through openings 42 in the lower sidewall of the housing, and auger 18 is movable axially through this tube. The multiple diameter tube 40 serves to permit more feed from within housing 24 to enter the conveyor and also serves to prevent over filling and/or over compaction of the feed in a manner as will appear.

Referring to FIG. 3A, an optional baffle 44 within housing 24 has one end attached to a side wall 28 of the housing at the upper end of the housing. Baffle 44 angles downwardly into the housing to form a chute for the feed F delivered to cup 14 from the hopper. In addition to baffle 44, a support plate 46 is also attached to a side wall 28 of the cup housing. The upper end of plate 46 is, as shown in FIG. 3A, attached to the same side wall 28 as is the upper end of baffle 44, so the baffle and plate depend from the same side of the housing. Baffle 44 overhangs plate 46 minimize the effect of "hydrostatic" pressure of the feed in the intake cup and hopper 12 from over compacting the feed. Or, as shown in FIG. 2, baffle 44 does not have to be used.

An agitator 48 is positioned in the tapered lower end of housing 24 so as to agitate the feed falling into the outlet of the intake cup. By churning or stirring the feed within housing 24, it will not be easily compacted and therefore will not bridge within the housing and will thus flow continuously down toward the conveyor. Agitator 48 first includes a pair of rotatable blades 50 and 52, respectively, commonly mounted for rotation on a shaft 54. The stirring blades are mounted on the shaft so they are at a 90_angle to each other as shown in FIG. 2. Shaft 54 extends through support plate 46 and is rotatably supported on the plate 46 and on housing 24 by bearings 56. A gear 58 is fixedly mounted on shaft 54. The gear is located such that its teeth 60 extend into the outlet portion 38 of the housing. The teeth mesh with flights 62 of auger 18 (see FIG. 3C). Consequently, movement (either axially or rotary) of the auger turns the gear, and rotation of the gear causes rotation of the agitator blades 50, 52. This produces the stirring action discussed above. In operation, upper blade 50 of the blade assembly promotes flowability of feed from the hopper, and the lower blade 52 provides agitation of the feed to keep it flowing into the outlet. As gear teeth 60 move in and out of mesh with the flights 62 of auger 18, the gear teeth move in toward the center of the auger and thus physically break up compacted feed carried by the auger. Thus, the gear teeth tend to prevent over compaction, over filling, and jamming of the conveyor. Further, as excess, compacted feed is dislodged from the auger by the gear teeth, fresh feed is re-mixed therewith such that fresh, loose feed is conveyed from the feed cup to feeders 22.

It will be appreciated that teeth 60 of gear 58 may be enlarged and may be of a bulbous shape so as to fit more closely between the flights 62 of auger 18 thereby to aid in breaking out compacted feed within the auger and to insure proper conveyor filling and to reduce or minimize the possibility of jamming the conveyor.

Figure 3B:
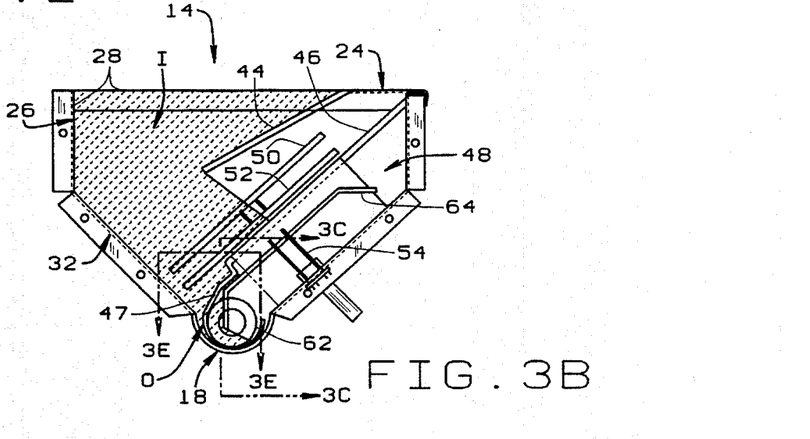
FIG. 3B is a sectional view of another embodiment of the cup of FIG. 3.
Figure 3C:
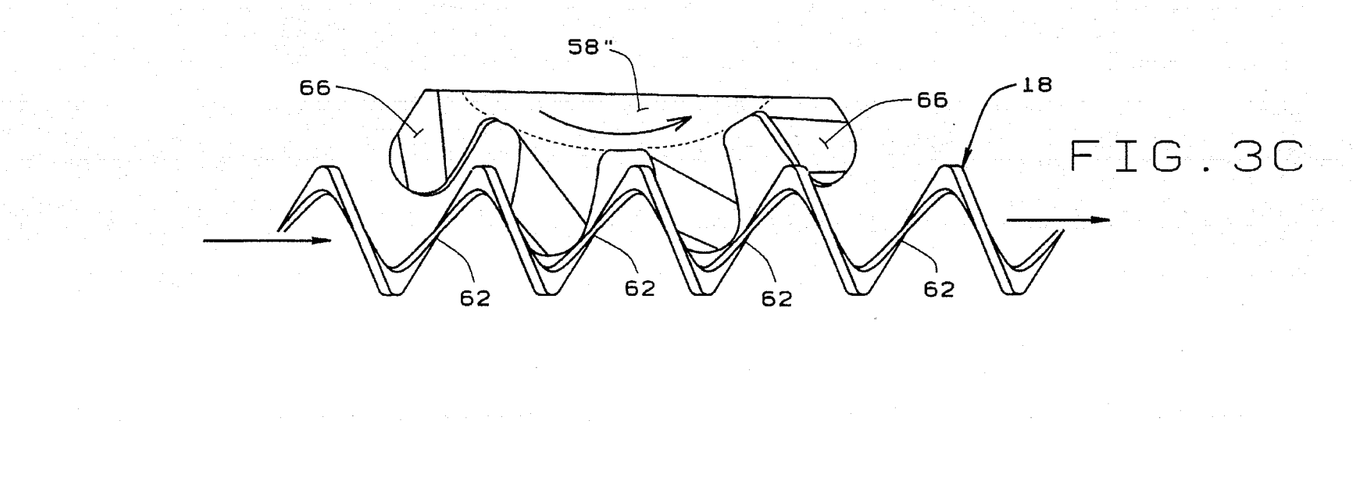
FIG. 3C is a view (see sheet 7) on an enlarged scale taken along line 3C—3C of FIG. 3B illustrating a gear having teeth bent out of the plane of the gear with the gear driven by the conveyor auger.
Figure 3D:
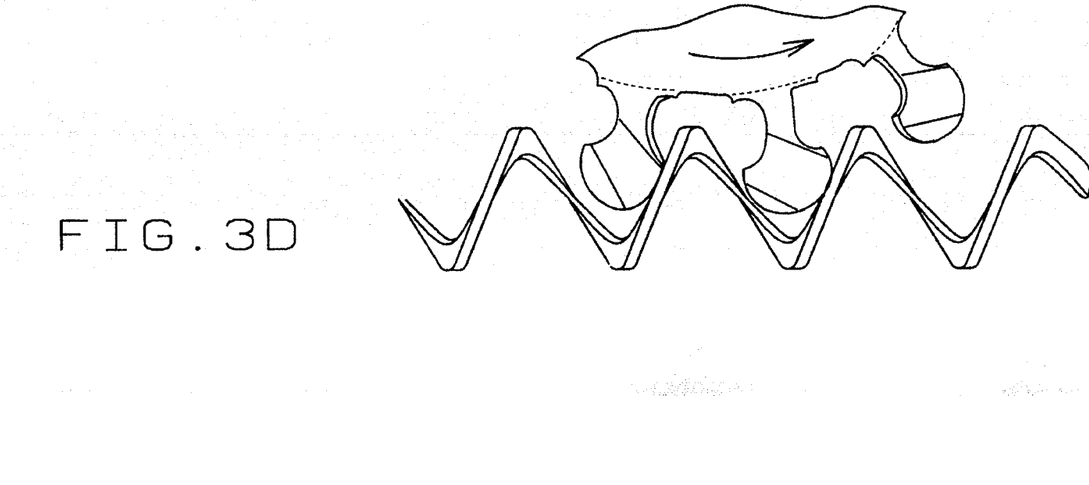
FIG. 3D is a view similar to FIG. 3C wherein the gear teeth have enlarged end portions interengageable with the flights of the auger so as to aid in the breaking up of compacted feed between the flights.
Figure 3E:
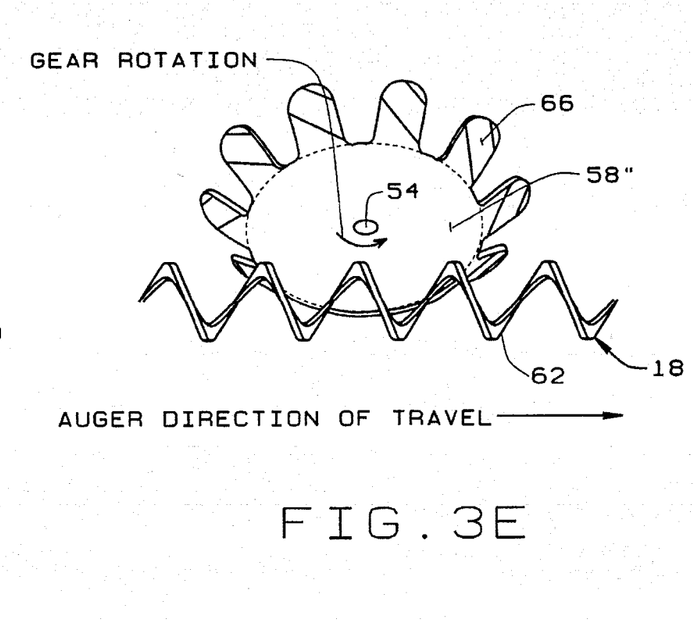
FIG. 3E is a view taken along line 3E—3E of FIG. 3C illustrating in plan manner in which the bent gear teeth mesh with the auger to dislodge compacted feed and to regulate the amount of feed.

FIGS. 3B and 3C illustrate an alternate embodiment of agitator means 48 from that shown in FIG. 3A. In FIG. 3B, a gear 58" (a third rotatable stirring blade) mounted on shaft 54. The teeth 66 of gear 58" are angled or bent with respect to the body of the gear for contact with flights 62 of auger 18. Now, as the auger is moved, the bent gear teeth 66 are engaged by the moving auger 18 thus causing gear 58" to be rotated in the appropriate direction producing, in turn, rotation of blades 50 and 52. Blades 50 and 52 function as previously described. Bent gear 58" provides the additional feature of regulating feed level. This is important when, for example, the auger is completely filled with feed. Through use of bent gear 58", as the bent gear teeth 66 move down into, across, and up out of the space between the flights 62 of conveyor 18, so as to dig out compacted feed thus resulting in a positive displacement of excess feed. In FIG. 3C, the bent gear 58" is shown in side elevation and it can be seen that bent gear teeth 66 move down and into the auger below the centerline thereof. Simultaneously, as shown in FIG. 3F, the teeth sweep horizontally across the auger. In this manner, compacted feed within the auger is positively broken up, dislodged and is physically discharged from the auger. This then allows the auger to move through the unloader cup and into conveyor tube 17 not completely filled thereby minimizing the tendency to jam. As discussed above, it is when the auger is filled that jamming of the system is likely to occur. Also, fresh feed within the intake cup may be mixed with the dislodged jammed feed.

As shown in FIG. 3b, a plate 47 is cantilevered from sheet 46 so as to extend above and along side a portion of auger 18 so as to prevent feed dislodged from the auger by gear teeth 66 from falling back into the auger. This aids in preventing jamming of the auger.

It will be understood that if gear 58" is moved toward or away from the center line of auger 18, the amount of feed positively dislodged from the auger may be regulated. More specifically, if gear 58" is moved in toward the centerline of the auger, teeth 66 will penetrate the auger to a greater extent and more feed will be displaced from between the flights.

It will be understood that while gear 58 is shown to be formed of relatively heavy sheet metal with gear teeth 66 bent therefrom, gear 58" may be molded from a suitable plastic. If gear 58" is molded of plastic, it may be desirable that the planar body of the gear be of a thickness corresponding generally to the thickness that its gear teeth 66 are "bent" out of the plane of the gear body. In other words, if the bent teeth 66 are bent out of the plane of the gear body ⅝ inch, the molded gear may have a thickness of ⅝ inches.

It will be appreciated that with the gear agitators 58 and 58" described above in regard to FIGS. 3A and 3B, auger 18 may either be linearly driven in tube 17 by a gear drive system as described in the above-noted U.S. Pat. No. 4,460,230, or may be rotary driven.

It will be appreciated that due to the construction of the intake cup 14 of the present invention and the operation of gears 58 or 58', the feed conveyor may be operated without jamming after all of the feed stations 22 have been completely filled. This insures that conveyor tube 17 is charged with feed between each of the feeders 22. Thus, upon startup of the conveyor system, feed is delivered simultaneously to all of the feeders thereby preventing the birds in a poultry house from being attracted to only a few of the first feeding stations to receive fresh feed.

Figures 4, 5A, 5B, 5C:
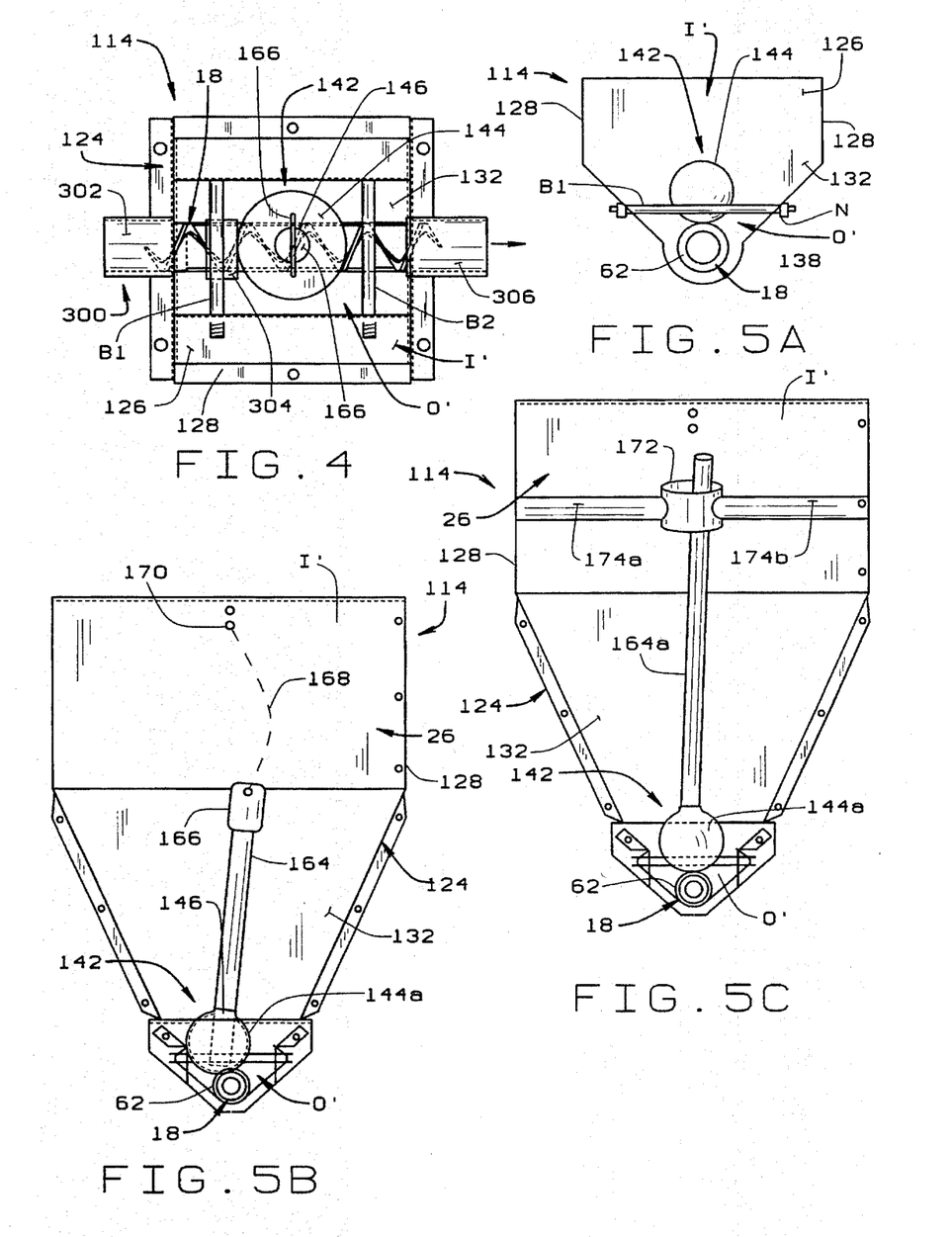
FIG. 4 is a top plan view of the cup with a ball installed in the cup and used in a second embodiment of the invention.
FIG. 5A is a sectional view of the cup taken along line 5—5 in FIG. 4.
FIGS. 5B and 5C illustrate additional ball configurations for the second embodiment.
Figure 6A:
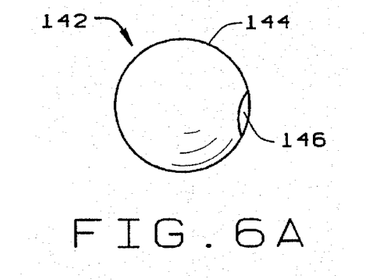
FIGS. 6A and 6B are, respectively, a perspective view of the ball (FIG. 6A) and a combined ball and agitator rod (FIG. 6B)
Figure 6B:
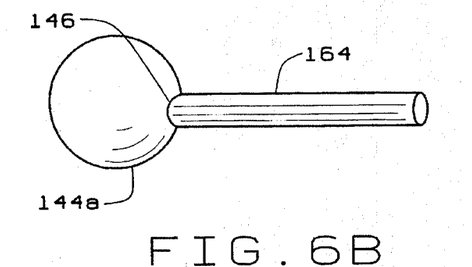

Referring now to FIGS. 4–6, a second and gearless embodiment of the feed intake cup and agitator is indicated generally 114. As before, cup 114 transfers or unloads feed from hopper 12 to conveyor 16 so the feed can be delivered to the feed stations 22. Cup 114 includes a housing 124 having an inlet I' which is connected to the outlet of hopper 12 for feed to flow into the housing through the inlet. Housing 124 has an upper rectangular shaped section 126 comprised of side walls 128. The upper end of the side walls define housing intake I'. The lower reaches of the side walls are angled to form a second and generally tapered section 132 for flowing the feed into housing outlet O'. As shown in FIGS. 4 and 5, bolts (or rods) B1 and B2 extend transversely of the centerline of the outlet across the housing. The bolts are located adjacent the respective end walls of the housing. The bolts are secured to the housing by nuts N. It will be noted that the bolts also act to stir the feed since the feed flowing into the outlet end of the housing must divert itself around the bolts, and then recombine.

The feed conveyor is connected to outlet O' for feed flowing through the housing to flow into the conveyor. The conveyor includes a hollow tube defined by a rounded section 138 of the housing walls formed at the lower end of the housing. Auger 18 is located in this tube for movement as previously described. Like cup 14, cup 114 includes an agitation means 140 positioned in the housing and movable by auger 18. As with the agitator paddles or blades 50, 52, means 140 agitates the feed to prevent the aforementioned compaction problem within housing 124. Agitation means 140 includes an agitator weight, preferably a ball 144, installed in the housing. The ball is sized to fit in outlet O', and as best seen in FIGS. 5A–5C, rests upon the upper portion of auger flights 62. The diameter of the ball is greater than the spacing of the flights of the auger. Consequently, ball 144 is caused to rotate and to move up and down (bounce) by movement of the flights 62 as auger 18 is propelled either linearly or rotatably. It will be understood that while linear movement of auger 18 is preferred, agitator 140 will work with rotary driven augers as well. Ball 144 is a relatively heavy metal ball so that it will bear against the flights of the auger and to be bounced up and down as the auger moves. As shown in FIG. 6A, the ball may be hollow and has an opening 146 formed in it. A hollow ball imposes less weight on the housing than a solid ball so the housing walls do not have to be reinforced and prevents undue compaction of the feed due to the weight of the ball.

Figure 7:
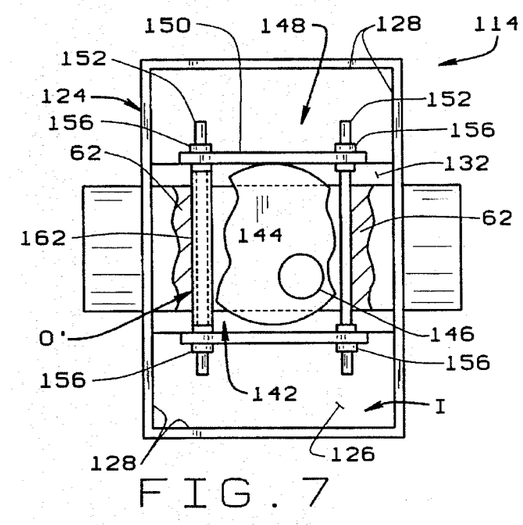
FIG. 7 is a plan view of the cup of FIG. 4 with portions of the ball broken away a frame installed in the housing of the cup for holding the ball agitator in a desired position with respect to the auger.
Figure 8:
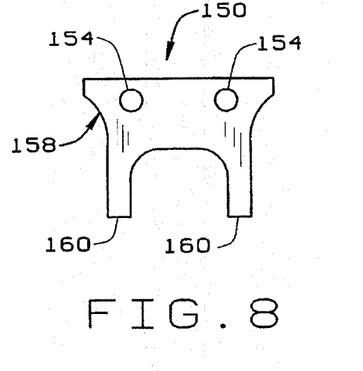
FIG. 8 is a side elevational view of one side member of the frame.

Referring to FIGS. 7 and 8, cup 114 further includes a frame 148 mountable in housing 124 for limiting movement of the ball so that the ball does not become dislodged from the auger. Frame 148 includes side pieces 150 which are connected together by bolts 152. The bolts are inserted through openings 154 in the side pieces and the bolts are secured to the side pieces by nuts 156 attached to each end of the bolts. As seen in FIG. 7, frame 148, when installed in the housing is positioned such that the spacing between the bolts somewhat greater than the diameter of the ball. This holds the ball captive and keeps the ball generally in register with the auger flights, and allows the ball to freely contact the auger flights. As shown in FIG. 8, the side pieces 150 each have an upper main body portion 158 in which the spaced openings 154 are formed. A pair of legs 160 depend from the sides of the main body. The legs are spaced apart such that when the frame is positioned in the housing, the base of the legs rest upon the transversely extending bolts B1, B2. The main body portion of the side pieces then keep the ball from being rolled up the tapering side walls of the housing. Finally, sleeves 162 can be fitted over the bolts 152 as shown for the left-hand bolt in FIG. 7. Each sleeve is of a plastic material which not only protects the bolts from damage by contact with the ball; but also, prevents any moisture in the feed from contacting the bolt and causing it to rust and prevent the feed from sticking to the bolts.

Referring to FIG. 5B, agitation means 140 is shown to include a ball 144a. Unlike the ball 144 shown in FIG. 6A, ball 144a has an elongate rod 164 fixed to the ball and extending upwardly therefrom into the upper reaches of the intake cup 114 above auger 18. As the ball moves up and down due to movement of auger 18, the ball and the rod are repeatedly move (oscillate) about and churn the feed falling into the outlet portion of the cup. In addition, the upper end of the rod may be flattened, as indicated at 166. A chain may be attached to this flattened end of the rod. The outer end of the chain is connected to a sidewall of the housing, at the upper end of the housing by a crossbar 170. Since the chain is connected to the free end of the rod, the chain tethers the rod in a generally desired vertical position, but allows the ball and the rod to be moved freely by the auger. Further, the chain provides a flailing action as this upper end of the rod moves around in the housing. This provides a further stirring action to the feed. In addition, if the feed were to bridge over any portion of hopper 14 or intake cup 12 so that feed could not flow down into the outlet O, the flailing action of the rod or chain would readily breakup any such bridging of the feed to reestablish the flow of feed.

While rod 164 is shown in FIG. 5B as being supported by a single chain 168, it will be understood that multiple chains may be used or even preferred to maintain the rod in its desired upright position and to further agitate the feed.

As shown in FIG. 5C, the length of the rod can be longer than that shown in FIG. 5B. Here, a rod 164a is attached to ball 144a so as to extend well up into hopper 114. A guide ring 172 is centrally positioned in this upper end of the housing. The ring is located in place by respective arms 174a, 174b. The upper end of rod 164a extends through the guide ring. Now, as ball 144a moves about, the upper end of the rod executes a swirling motion which is generally circular. The extent of this motion defined by the extent to which the upper end of the rod extends through the guide ring and the diameter of the guide ring. In any event, the result is to provide a stirring motion for the feed flowing through the cup.

With the above described embodiments using the ball 144 or 144a (as shown in FIGS. 4–7), it will be understood that the ball could be of different diameters. The constraint is that the diameter be large enough that the ball not slip between adjacent flights 62 of auger 18 and block its operation. On the other hand, the diameter cannot be so great that an adequate continuous flow of feed into the outlet of the cup is prevented. Similarly, the length of rod 164 can be of any of a range of lengths. The constraint is that it cannot be so short as to allow itself to fall between adjacent flights of the auger. Again, this would jam the auger.

While the balls 144, 144a are shown to be positioned above the centerline of auger 18, it will be appreciated that in certain designs of the intake cup 114, the balls may be located off the vertical centerline of the auger between about approximately the 10 O'clock or 2 O'clock positions. It will be understood that if ball 144 is located off the centerline of auger 18, the auger will impart not only vertical movement to the ball, but the ball will also be rotated.

Figure 15:
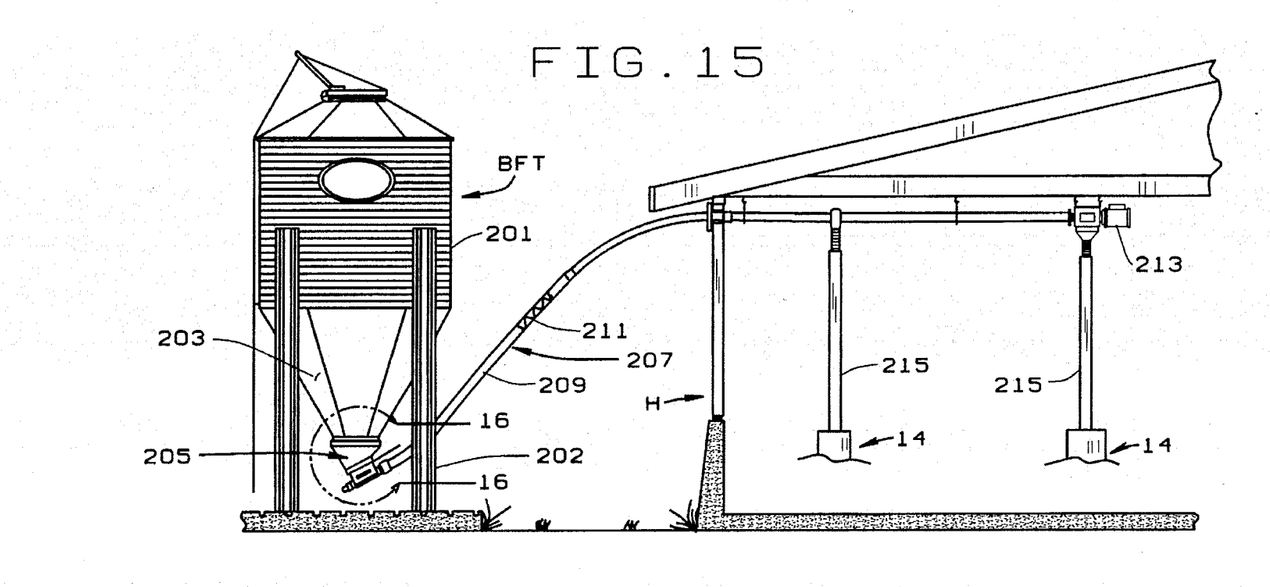
FIG. 15 is a view of a bulk feed tank which supplies feed to the intake feed cup of FIG. 1 with the bulk feed tank having an outlet boot at the bottom thereof with a rotary driven auger within the boot and with an agitator in the boot similar to the agitator disclosed above in regard to FIGS. 4–8.

Referring now to FIG. 15, a bulk feed tank BFT is shown located proximate a poultry hose H in which feeding system 10 is installed. Typically, such bulk feed tanks (or other storage silos or bins) are used in conjunction with feeding system 10 to store large quantities of feed and to supply the intake feed cups 14 and 114 previously described. As shown, the bulk feed tank has a raised tank body 201 with a downwardly converging outlet section 203. At the bottom end of the outlet section, an outlet boot 205 is provided for directing feed from within the tank into a feed supply auger conveyor 207.

The feed supply auger conveyor 207 has a conveyor tube 209 in which a rotary driven auger 211 is driven by a motor 213. The auger conveyor supplies feed by means of drop tubes 215 to the intake cups 14 and 114 located within the poultry house. A portion of the auger within boot 205 is open to feed in the lower reaches of the outlet section 203.

Figure 16:
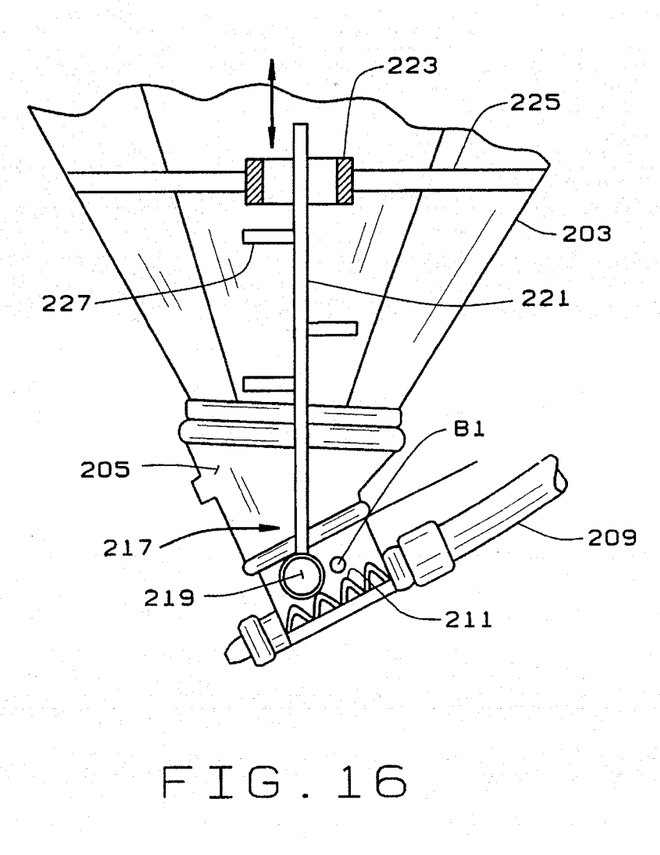
FIG. 16 is an enlarged view taken on line 16—16 of FIG. 15 illustrating a ball agitator/rod for breaking up compacted feed within the outlet or boot portions of the bulk feed tank.

As best shown in FIG. 16, a ball agitator 217 (similar to agitators 140 previously described in regard to FIGS. 4–8) is provided within boot 205 and outlet section 203 so as to agitate the feed therein and to insure the free flow of feed to auger 211. More particularly, ball agitator 217 comprises a ball weight 219 positioned within outlet boot 205 in position to bear on the exposed section of auger 211 such that the ball weight will be bounced up and down and in other manners upon rotation of the auger by drive motor 213. The ball weight may be provided with a rod agitator 221 similar to rods 164 or 164a previously described, except the agitator rod for a bulk feed tank may be considerably longer than the rods used in an intake cup application. For example, an agitator rod for a bulk feed tank my be 6–10 feet long. Of course, the agitator rod 221 may be guided by either a fixed ring collar 223 (similar to collar 172) supported within outlet section 203 by arms 225, or by a tether chain (not shown in FIG. 16) similar to chain 168 in the manner heretofore described in regard to FIGS. 5B and 5C. Further, the agitator rod 221 may optionally be provided with arms or pegs 227 which extend out from the rod at various positions therealong so as to engage and to stir more feed than an agitator rod without the arms could contact upon the ball weight being moved (oscillated) by the auger.

As previously noted, rod 221 may be several feet long so as to extend a considerable distance above auger 211. As the rod 221 oscillates up and down, compacted feed within outlet 203 is caused to fall downward around rod 221 toward the auger thus forming an inverted cone-shaped area of loosened feed or, in some instances, an inverted cone-shaped opening. Continued up and down movement of rod 221 loosens the compacted feed all along the length of the rod.

It will be appreciated that by using the ball agitator 217 and rod 221 within a bulk feed tank, cumbersome unloading flails and other unloaders previously used with bulk feed tanks may be eliminated. Upon start up of the auger drive motor 213, ball agitator will automatically be operated. Alternatively, it will be appreciated that in some bulk feed tank applications or the like, the ball agitator above described may employ drive other than an auger. For example, the ball agitator may be bounced up and down or otherwise oscillated by means of a rotary driven cam or other oscillatory drive.

In conjunction with or separate from the use of ball agitator 217 in boot 205, a bent gear agitator (not shown in FIGS. 15 or 16) similar to gear 58" described in conjunction with FIGS. 3B and 3C above may be employed. More specifically, the bent gear teeth 66 of gear 58" are engaged by auger 211 such that rotation of the auger by drive motor 213 causes the gear 58" to rotate. Thus the bent gear teeth 66 positively draw feed from boot 205 into the auger, and, if such auger becomes filled with compacted feed, tends to dig out the compacted feed.

Figure 10:
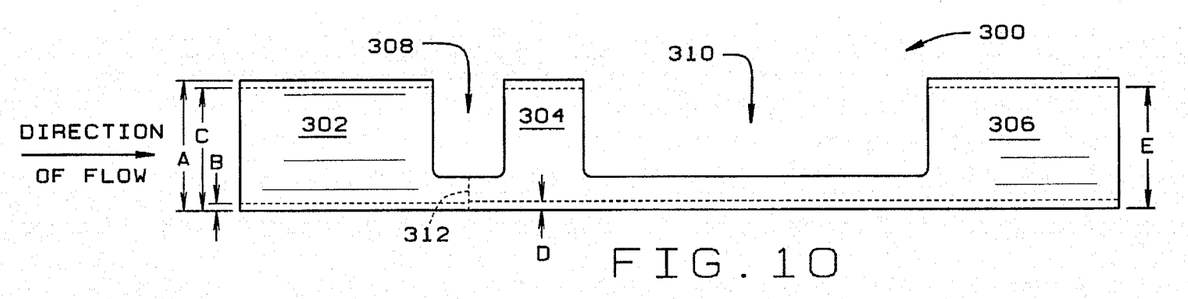
FIG. 10 is a side view of the tube.
Figure 11:
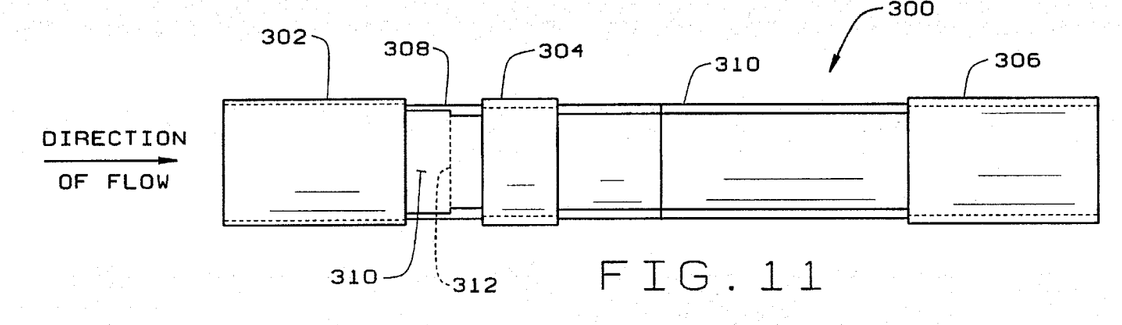
FIG. 11 is a top view of the tube.

In addition to use of the gear driven agitators 48 in cup 14, or the agitator 142 of cup 114, the present invention may further be constituted by multiple diameter agitator or regulator tube 300 (see FIGS. 9–13) which is insertable through the outlet portion of housing 24 or 124. Auger 18 extends through tube 300 and is movable therein, reciprocally or rotatably, to transport feed through conveyor 16. As seen best in FIGS. 10 and 11, tube 300 has three sections, as indicated at 302, 304, and 306, respectively, with a narrow cutout 308 being made between sections 302 and 304, and a substantially longer cutout 310 between sections 304 and 306. As indicated in FIG. 10, tube 300 the auger enters the tube at its left hand end and exits from the right hand end. Auger 18 may, for example, have an outer diameter of about 1.438 inches (3.65 cm). Tube 300 has a uniform outer diameter A along its length. This diameter may, for example, be 1.75 in. (4.45 cm.) and the radius 0.875 in. (2.22 cm). The wall thickness at the inlet end 302 of the tube is indicated B and is (for example) 0.035 in. (0.089 cm). This means the inside diameter of the pipe, at its inlet end 302 is 1.68 in. (4.27 cm) which is considerably larger than the outer diameter of auger 18. In addition, the distance from the lower outer wall of the tube to the upper inner wall thereof, dimension C in FIG. 10, is 1.715 in. (4.36 cm). As can be seen in FIG. 13, the inner diameter of the inlet section 302 of tube 300 is approximately the same as the inner diameter of conveyor tube 17. The later has a flared, bell end 17' sized to be received on the end of section 302 to connect the conveyor tube to tube 300.

Tube 300 may, for example, have a length of about 12 in. (30.5 cm). Section 302 is 2.625 in. (6.67 cm) in length. Cut out section 308 is, for example, 1 in. (2.54 cm) in length. Approximately halfway along the length of section 308, or 3.125 in. (7.94 cm) from the inlet end of the tube, the wall thickness of the tube changes from the dimension B value to the thicker wall thickness as indicated by dimension D. This transition in thickness is indicated at 312. The new wall thickness of the tube is, for example, 0.113 in. (0.29 cm), and is uniform throughout the remaining length of the tube.

Tube section 304 is also 1 in. (2.54 cm) in length and has the thicker wall. The inner diameter of the tube at intermediate uniform section 304 is now reduced to 1.524 in. (3.87 cm), which is only somewhat greater than the 1.438 in. (3.65 cm) diameter of auger 18. It will be appreciated as auger 18 enters section 304, any excess compacted feed carried on the outside of the auger 18 is physically stripped from the auger. In addition, the relatively close tolerance between the inner diameter of stripping section 304 and auger 18 tends to guide the auger as the later passes through tube 300.

Cut out 310 extends for 4.75 in. (12.07 cm), for example. The wall thickness throughout this section is the thicker wall section. Lastly, section 306 is the same length as section 302. The wall thickness at this outlet end of the pipe is the thicker wall thickness. Now, the distance from the lower outer wall of the tube to the upper inner wall, dimension E in FIG. 10, is 1.638 in. (4.16 cm). These dimensions and the corresponding cross sectional areas of the tube, the auger, and the amount of feed in the auger at various locations are shown in FIG. 13.

The construction of regulator tube 300, as above described, is designed to prevent feed compaction in auger 18. It will be noted that the transition in the tube at 312 from a larger inner diameter to a smaller diameter is located in the cutout section 308 of the tube. Since larger diameter section 302 is at the inlet end of the tube, excess feed which has traveled around the conveyor loop with the auger is subject to a stripping or scraping action as the auger enters intermediate section 304 which is of the smaller diameter so as to scrape the excess feed off the auger. The scraped off feed flows via discharge opening 308 back into the cup. Fresh feed delivered through the cup to the outlet now enters the tube through inlet cutout 310. The scraped off feed is stirred in the with new feed by either gear agitator 48 or by a ball agitator 140, as previously described. As the auger, with the excess feed scraped off and with a full charge of loose, fresh feed from inlet opening 310, enters the smaller diameter scraper section 306 and as the auger moves with the conveyor tube, the feed level within the conveyor tube and excess feed is removed from the auger so as to regulate or meter the amount of feed carried by the auger to a predetermined amount. As the auger enters the full diameter of the conveyor tube 17 which is of a larger cross section than regulator section 306, a void V (see FIG. 13F) is formed in conveyor tube 17 thus insuring that the feed in the conveyor is not jammed and is free to flow into each of the feeding stations 22.

As a result, dual diameter regulator tube 300 performs the feed regulation and compacted feed dislodgment functions earlier described and performed by the gear teeth 60 or 60' of gears 58, 58". Because compacted feed is scrapped from the auger by small diameter section 304, and because the scrapped off excess feed is returned to the interior of the intake cup, the regulator tube 300 functions like a stationary agitator thus eliminating for the need for rotary gears and other moving parts. It will be understood that while discharge opening 308 and inlet opening 310 are shown to be separate from one another, it has been found that a single opening may function as both the discharge and inlet opening.

It will be appreciated that by changing the inner diameter of sections 302 and 304 relative to the diameter of the auger 18, the amount of feed regulation effected by tube 300 may be varied.

Figure 12:
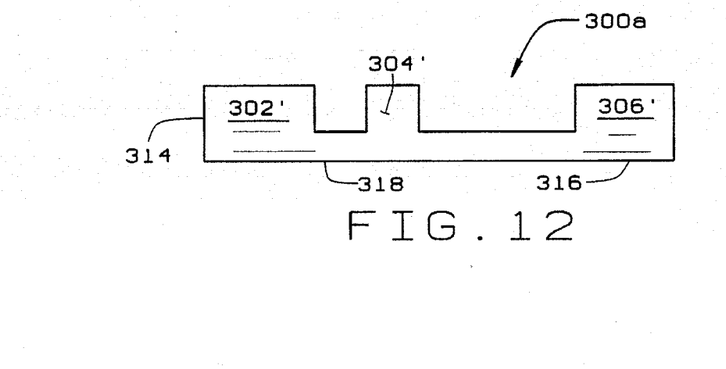
FIG. 12 is a side view of a second embodiment of the tube.
Figures 13, 13E, 13F:
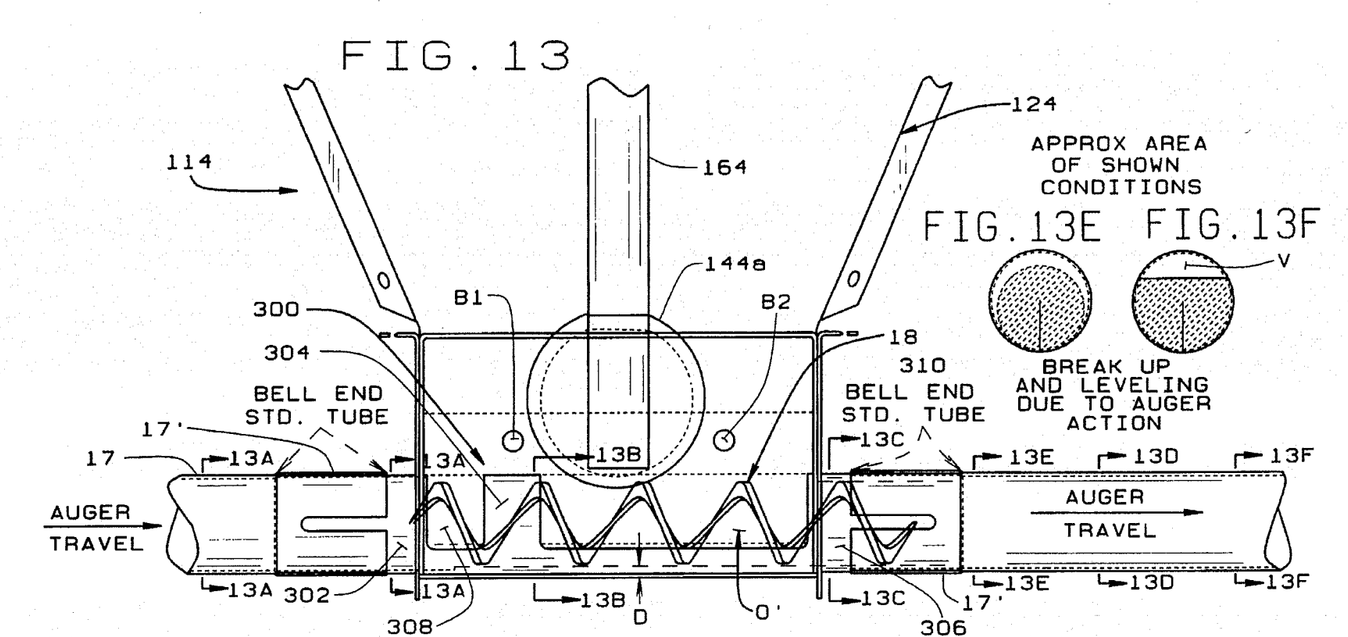
FIG. 13 is a side elevational view of the lower portion of an intake feed cup of the present invention incorporating the regulator tube of FIGS. 9–12 illustrating the conveyor tube having a flared bell end adapted to be received on an inlet tube and on an outlet tube of the intake housing.
FIG. 13A–13F illustrate the various diameters of the agitator tube and their relation to the diameter of the conveyor tube and the auger so as to loosen compacted feed, to supply fresh feed, and to form a void (regulate) in the conveyor tube to prevent over filling.
Figure 13A:
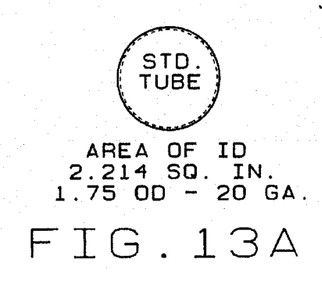
Figure 13B:
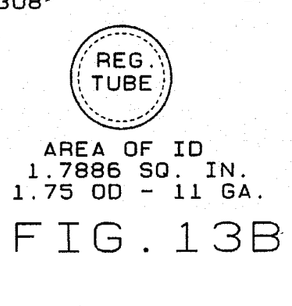
Figure 13C:
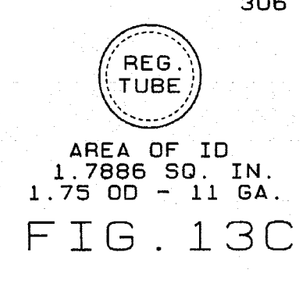
Figure 13D:
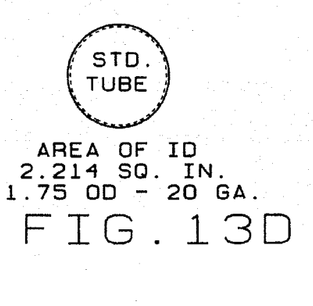

With respect to FIG. 12, a tube 300a, is shown to be comprised of two tubes 314 and 316, respectively. Both tubes have identical outer diameters corresponding to the diameter values noted above. Tube 314 has a different inner diameter from that of tube 316. Again, these diameter values correspond with those discussed for tube 300. The length of the tubes correspond to the respective lengths of the larger and smaller diameter sections of the tube 300. Tubes 314 and 316 are connected together, for example, by welding as indicated at 318. While tubes 314 and 316 could be joined together to form the tube, a single tube may be preferable for use in the conveying system. This is because a single tube is easier to align during installation, and does not require as many welds to connect to the housing of cup 14 or 114, and the conveyor tube 17.

Referring now to FIG. 13 and to FIGS. 13A–13F, multiple diameter agitator tube 300 is shown installed in an intake cup 114 (as illustrated in FIGS. 4–9). As shown, the ends 302 and 306 of the agitator tube extend from the outlet portion O' of the intake feed cup. These ends have an outer diameter somewhat less than the inner diameter of a flared bell end 17' of a conventional conveyor tube 17 such that with a flared end on the conveyor tube, the flared ends of the conveyor tube may readily be installed on the protruding ends 302 and 306. It will be noted in FIG. 13 that the inner diameter of conveyor tube 17 and the inner diameter of the ends 302 and 306 are approximately the same. As shown, auger 18 extends through the multiple diameter agitator tube 300 and the auger is preferably linearly driven in the direction shown by the arrow in FIG. 13 such that end 302 constitutes and inlet end and such that end 306 constitutes an outlet end.

Referring to FIG. 14, a typical feed conveyor 16 is illustrated having a linearly propelled feed conveyor auger 18 driven by drive motors 20A or 20B. The latter drive a coarse pitch gear which has teeth in mesh with the flights 62 of auger 18 so as to linearly (axially) drive the auger through the conveyor tube 17. As shown, feed conveyor 16 is an endless loop conveyor. In such conveyor systems, it is necessary to join the ends of auger 18 together, as by brazing or by using a connector. This creates a double thickness of the auger in the location of the joint. It has been found that as such continuous loop augers circulate feed in the conveyor after the feeders 22 have been filled, a so-called back lagging effect may be encountered. Back lagging is a condition in which feed conveyed with the auger between adjacent flights is spilled over the trailing flight into the space behind and in which feed from the space between a pair of flights moves rearwardly through the center opening of the auger toward the trailing flights. Generally, such back lagging is uniform from flight to flight and does not present a problem (except that the efficiency of the conveyor is diminished). However, in the area of the joint between ends of the conveyor, a more serious problem is encountered.

More particularly, the double thickness of the joint between the ends of auger 18 effectively prevents feed from flowing in a backward movement past the joint. Further, the double thickness of the joint partially blocks the flow of feed through the center of the auger. As such, a void will form behind the joint and a solid slug of feed will buildup in from of the joint. With continued operation of the conveyor after the feeders have been filled, and with additional feed being supplied to the auger from feed cups 14, the slug of compacted feed carried along with the joint will grow (increase in length). Of course, the more compact the feed becomes in this slug and the longer the slug becomes, the more friction it creates as it moves through conveyor tube 17 thus increasing the amount of power required to drive the auger around the conveyor loop.

Referring to FIG. 14, a test conveyor loop CL is shown having a test length of about 70 feet and a width of about 10 feet. The test loop has two auger drive motors, as shown at 20A and 20B, and a pair of intake feed cups 14 of the present invention installed in the conveyor loop. The turns of the conveyor are shown to be 90 degree corners and are indicated at C. The conveyor loop CL has a conveyor tube 16 and an auger 18, as previously described.

In a first test, the conveyor was driven only by drive motor 20A and was operated for about 15 minutes to with no feed in conveyor tube 17 and with no feed in the feed cups 14 so as to establish a steady state no load condition. The current supplied to drive motor 20A was measured to be 4.3 amps. Feed was then supplied to intake cups 14 so as to fill the conveyor and an excess supply of feed was maintained in each of the feed cups so as to continue to add feed to the conveyor. As the feed was added, the current required by drive motor 20A increased to 5.3 amps. As the filled conveyor continued to circulate for about 15 minutes, the current required by the drive motor increased to 7.1 amps at which point the conveyor would jam and the drive motor would be unable to continue to drive the auger in the conveyor tube. Under such high load conditions, even if the auger did not jam in the conveyor tube, if the drive motor would be shut off, the auger could not be re-started. In accordance with this invention, a re-leveling box 401 was placed in conveyor tube 17 upstream from drive motor 20A so as to breakup the slug of feed in the conveyor and to prevent jamming. More specifically, re-leveling box 401 comprises either a dual diameter metering tube 300 or a gear 58 or 58" agitator and an accumulator supply hopper 403 with the metering tube or the gear agitator positioned so as to positively break up the slug of feed in the conveyor, to strip excess feed from the auger as the later passes through the re-leveling box, and to resupply the stripped feed to feed voids in the auger as they present themselves while moving through the re-leveling box. More particularly, if metering tube 300 is used, as the slug of compacted feed moves therethrough, excess feed is stripped from the auger by the stripping section 304 and the stripped feed is directed into the hopper 403 via discharge passage 308 to await the passage of a void in the auger. The feed in the hopper 403 with then flow into the void via passage 310. In this manner, the compacted slug of feed is broken up each time it passes through the re-leveling box and the trailing void is refilled. In tests with the test loop CL as above described, it has been found that with the conveyor filled with feed and with the intake cups constantly supplying additional feed to the conveyor, the conveyor would reach a steady state conditions in which the drive motor 20A would draw only about 5.3 amps and would maintain this even when the auger was continued to be driven for up to four hours with no increase in current to drive motor 20A.

If a bent gear 58" is used in place of the dual diameter tube 300 in re-leveling box 401, it will be understood that the gear is mounted in the re-leveling box such that the gear is free to rotate with gear teeth in mesh with the auger as it passes therethrough. Thus, teeth 66 tend to dislodge compacted feed from between the flights 62 of the auger and to form a void in which fresh feed or dislodged feed may flow so as to prevent the buildup of a slug of feed which will result in jamming of the conveyor.

What has been described is an improved feed intake cup for use in a poultry feeder system by which feed is delivered from a hopper to a feed conveyor by which the feed is conveyed to a plurality of feeding sites. The conveyor system uses an auger for moving the feed and improved intake cup prevents the auger being jammed. The intake cup, as described above, simply and easily prevents compaction of feed which would otherwise cause the jamming. It does this by jolting the auger as it moves through the cup, or by turning a pair of paddles to agitate, by vibration of the auger or stirring of the feed, the feed delivered to the auger. An important feature of the cup is the dual diameter tube in which the feed drive auger is positioned. By installing the tube so the auger is driven from the larger into the smaller diameter portion of the tube, excess feed can be removed from the conveyor rather than being constantly recirculated. This also helps prevent compaction of the feed and potential jamming. Additionally, the dual diameter regulating tube has no moving parts and thus is simple to construct and to operate.

Figure 18:
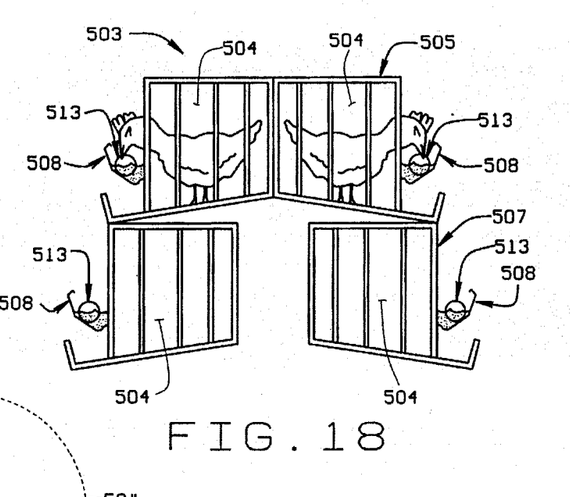
FIG. 18 is an end view of a poultry cage system having trough feeders for supplying feed to the birds confined in the cages with the level of the feed in the tough feeders being illustrated.
Figure 19:
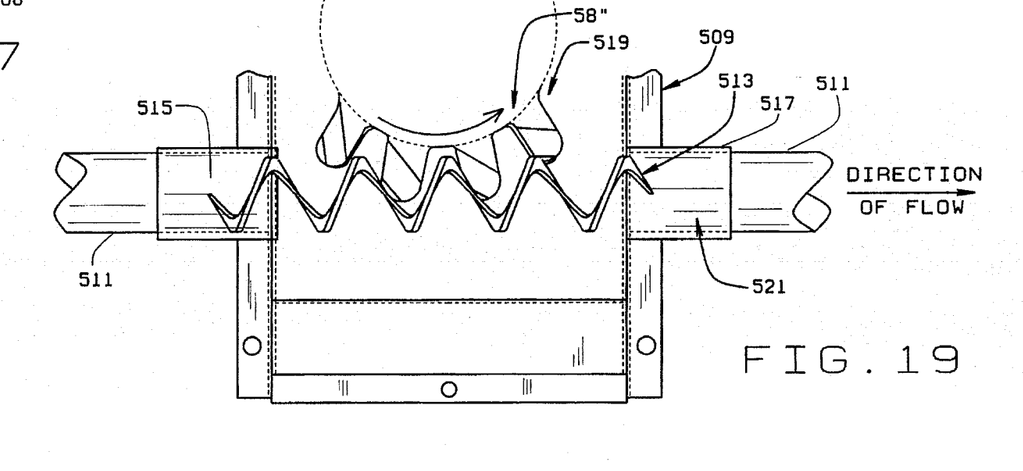
FIG. 19 illustrates a feed conveyor for a trough feeder having a gear auger unloader, similar to that shown in FIGS. 3A–3C for positively removing feed from the auger and a restrictor, as shown in FIG. 13C, for insuring a void within the feed conveyor tube downstream from the restrictor thereby to prevent overcompaction and jamming of the feed conveyor.

Referring now to FIGS. 17–19, another embodiment of the feed conveyor regulator of the present invention is shown for regulating the feed supplied to open trough feeders 501 in a poultry cage system 503 as is typically used in egg production operations. More specifically, cage system 503 comprises a multiplicity of side-by-side cages 504 for housing one hen or the like with the cages 504 being arranged in an upper layer of cages 505 and a lower layer of cages 507. Each layer of cages has a feed conveyor 508 which receives feed from a bulk feed supply (e.g., a bulk feed tank BFT, as shown in FIG. 15) for conveying feed to trough feeders 501. Specifically, feed from the bulk feed supply is conveyed through an overhead feed conveyor 207 by means of an auger (e.g., auger 211 shown in FIG. 15) disposed within conduit 209 driven by an auger motor 213. The feed drops down to conveyor 508 through vertical drop tubes 215 into feed intake cups 509, generally similar to feed intake cups 14 heretofore described. The feed cups 509 receive the feed and allow it to be picked up by feed conveyor 508 for being conveyed to a respective trough feeder 501. It will be appreciated that the feed cups 509 need not have a large volume of feed therein, but rather they act primarily as an accumulator for the transfer of feed from the drop tubes 215 to the feed conveyor system 508. While in FIG. 17, only one feed cup 509 is shown for each conveyor system 508, it will be understood that multiple feed cups can be provides such that fresh feed will enter the conveyor system at multiple locations around the conveyor loop. Each trough feeder 501 is disposed in generally horizontal position near the front of a row of cages 504 such that the birds in the cages may have ready access to the feed conveyed by the trough conveying system, as shown in FIG. 18. Specifically, the trough feed conveyor includes trough conduit tubes 511 interconnecting the trough feeders 501 to one another and to feed intake cup 509 in a preferably endless loop, as shown in FIG. 17. An endless, flexible auger conveyor element 513 (as shown in FIG. 18) similar to auger 18 is disposed within conveyor tubes 511 and extends through trough feeders 501. The trough feeders are open at their tops and the birds are free to eat feed from the troughs, as illustrated in FIG. 18.

Referring to FIG. 19, each feed intake cup 509 is similar in most respects to feed intake cup 14 heretofore described. Thus, only the primary differences with be herein explained. Cup 509 has an inlet end 515 and an outlet 517 which are in communication with conveyor tubes 511. As auger 513 passes though the intake feed cup housing, feed from conveyor tube 207 delivered to the feed intake cups via drop tube 215 is free to fill the auger 513 between the flights 62. Auger 513 is shown to be an elongated helical spring-like conveying element which is axially driven through the housing by means of a gear drive 514, such as is described in U.S. Pat. No. 4,640,230 which is herein incorporated by reference. The feed between the auger flights is conveyed into the feed outlet 517 and then into the conveyor conduit 511 for being delivered to the feeding troughs. While feed conveyor 508 is described as a helical auger conveying element axially driven through the conveyor tube 511 by a gear drive, it will also be understood that in certain application, the auger may be either a flexible cable having conveying plates or flights (conveying elements) spaced at intervals along the cable where the conveying plates are sized to have a diameter somewhat less than the inner diameter of the conveying tube 511. Alternatively, the conveyor may be a chain conveyor having plate-like flights (conveying elements) fastened to the chain at spaced intervals therealong. Both the cable and chain conveyors, as above-described, are axially driven through their respective conveyor tubes by means of a gear or drive sprocket in mesh with the conveyor cable or chain.

In accordance with this invention, means, as generally indicated at 519, is provided for regulating the amount of feed carried by auger 513 in such manner that excess and overcompacted feed is positively removed from the auger thereby to prevent overcompaction of the feed within conveyor tube 511 thereby to prevent jamming of the auger within the conveyor tube. Further, means 521 is provided for positively removing feed from between the flights 62 of auger 513 to an amount less than the full amount that would normally be carried if the feed filled all of the volume between the flights to the full diameter of the auger.

This positive feed unloading means 519 is shown to comprise a gear 58 or 58" as heretofore described in regard to FIGS. 3A–3D. As shown in FIG. 19, gear 58" has gear teeth 66 which are in mesh with flights 62 of auger 513. As the auger is transported axially through feed intake cup 509, the axially moving flights 62 each engage a respective gear tooth 66 and causes the gear to rotate about its center. As a gear tooth moves down toward the auger and engages the feed (regardless of whether the feed is compacted or loose), the gear tooth 66 digs down into the feed between the flights as the tooth penetrates the auger toward the center thereof. As the gear tooth begins it exit from between the flights, the gear teeth lift a volume of feed from between the flights and the rotary action of the gear teeth prevent other feed from within the intake feed cup form replacing the feed positively dug out of the auger by the exiting gear teeth. In this manner, the feed actually transported by auger 513 is less than the volume of the feed contained between the flights of the auger. It will be appreciated that if the feed unloading means as above described is used with the cable and spaced conveying plate/flight feed conveyor or with the chain conveyor described above in place of the axially driven auger 513, the unloading gear 58 or 58" will function so as to positively unload feed from between the conveying plates to an amount less than would normally be present between the conveying plates if the entire volume were filled with feed.

Means 521 comprises a restrictor sleeve 523 which surrounds auger 513 and which is sized like restrictor section 306 of tube 300 heretofore described to be only somewhat larger in diameter than the outer diameter of the auger such that any excess feed that is carried by the auger as it exits feed intake cup 509 is forcefully removed from the auger. As is further noted, the diameter of restrictor sleeve 523 is somewhat smaller in diameter than the inner diameter than conveyor tube 511 such that a void is formed inside the conveyor tube downstream from the feed intake cup, similar to the void V heretofore described in regard to FIG. 13F. It will be further appreciated by those skilled in the art that the restrictor sleeve 523 may be used with not only a helical auger, such as auger 513, but also with cable and chain conveying systems of the type as above-described.

Thus, it will be appreciated that with the combination of the gear unloader 58" which positively removes feed from between the augers and which prevents additional feed from within the intake feed cup 509 from re-filling the areas from between the flights from which the gear teeth 66 of the gear unloader 58" have removed the feed and the restrictor sleeve 523 which insures the formation of a void within the conveyor tube conveys an amount of feed from the intake cup into a first trough feeder 501. Initially, the open trough feeder will be essentially empty of feed and as the feed is initially conveyed into the trough feeder from the inlet end thereof, the axially moving auger 513 will transport feed within the trough longitudinally therealong and the axially moving auger will tend to level the feed within the trough. Because the amount of feed entering the first trough is less than the full amount of the cross sectional area of the conveyor tube 511 (due to the action of one or both of the regulating means 519 and/or 521), once the trough becomes essentially filled with feed up to a predetermined level (which may depend on the shape and depth of the trough feeder in the area through which the auger 513 moves through the feeder), the auger will transport feed out of the first trough feeder and into the conveyor tube 511 to supply other trough feeders 501 downstream from the first trough feeder. It will be appreciated that once the feed level in the first trough feeder reaches its predetermined depth, because the amount of feed entering the first trough feeder is regulated to an amount less than the full amount of the feed filling the conveyor tube 511, an essentially equal volume of feed may be transported out of the first trough feeder 501 by the auger 513 thus establishing a steady state level of the feed in the first feeder. This steady state feed level will, of course, also be established in the second and all other trough feeders in the conveyor loop downstream from the first feeder. In this manner, continued operation of the feed conveyor 508 will not tend to overfill the feeders to a level greater than the desired level and the birds feeding from the last trough feeder 501 in the conveyor loop will receive substantially the same amount of feed (as determined by the depth of the feed in the trough feeder presented to the bird).

In view of the foregoing, it will be seen that the several objects of the invention are achieved and other advantageous results are obtained.

As various changes could be made in the above constructions without departing from the scope of the invention, it is intended that all matter contained in the above description or shown in the accompanying drawings shall be interpreted as illustrative and not in a limiting sense.

What is claimed is:

1. Feed conveying apparatus for a poultry or livestock feeding system, said apparatus comprising a housing having a feed inlet which receives feed from a feed supply and a feed outlet, a feed conveyor extending through said housing, said feed conveyor having a multiplicity of conveyor elements and being driven within said conveyor tube for picking up feed from said housing and for conveying it through said conveyor tube, and means for regulating the mount of feed within said conveyor tube downstream from said housing to an amount less than will totally fill said conveyor tube so as to form a partial void within said conveyor tube and to prevent overcompaction of said feed within said conveyor tube.

2. Apparatus as set forth in claim 1 wherein said regulating means comprises a regulating tube within said feed outlet having a diameter smaller than the diameter of said conveyer tube and only somewhat greater than the diameter of said conveyer elements so as to regulate the mount of feed carried by said conveyor and to insure that said partial void is provided in said conveyer tube downstream from said regulating tube.

3. Apparatus as set forth in claim 1 wherein said regulating means comprises a gear having a plurality of teeth in mesh with said conveying elements of said conveyor such that movement of said conveying element causes said gear to rotate and causes said teeth to enter and to exit the space between said flights and to thereby positively displace feed from between said flights such that as said feed carried by said conveyor enters said conveyer tube said partial void is formed.

4. Apparatus as set forth in claim 3 wherein said gear is rotatably supported within said housing on a shaft, said shaft being rotary driven by said gear, said shaft carrying stirring means positioned within said housing so as to stir the feed as it makes its way from said feed inlet to said feed outlet.

5. In a feed conveying system for a cage poultry system in which birds in cages are supplied with feed from an open trough feeder, sad feed conveying system comprising a bulk supply of feed, means for conveying said feed from said bulk supply to said trough feeders, said conveying means comprising a feed intake cup for transferring feed from said bulk supply to a feed conveyer connecting said trough feeders to one another and to said feed intake cup, said feed conveyor comprising a conveyer tuba extending along a conveyor path from said feed intake cup to a first trough feeder and thence to a second or more trough feeder and thence to return to said feed intake cup, a conveying element located within said conveyer tube and extending along the conveyor path of said conveyer tube in an endless loop, said conveying element having spaced flights therealong for conveying feed, and means for driving said conveying element within said conveyer tube and around said endless loop for conveying feed from said feed intake cup to said first feeder and thence to convey feed from said first feeder to said second and subsequent feeders, and thence to return excess feed to said feed intake cup, wherein the improvement comprises: means for regulating the amount of feed within said conveyor tube downstream from said feed intake cup to an amount less than will totally fill said conveyor tube so as to form a partial void within said conveyor tube and to prevent overfilling of said trough feeders.

6. In a feeding system as set forth in claim 5 wherein said regulating means comprises a restrictor on the outlet of said feed intake cup through which said conveying element passes with said restrictor being sized to have an inner diameter only somewhat larger than the outer diameter of said conveying element such that said restrictor positively prevents said conveying element from conveying more feed into said conveying tube and into said trough feeder than the diameter of said restrictor such that when the level in the feed in the first of said trough feeders reaches a steady state depth, said conveying element will convey an amount of feed from said first trough feeder substantially equal to the amount of feed being delivered to said first trough feeder in a given increment of time such that a uniform depth of feed will be maintained in said first trough feeder.

7. In a feeding system as set forth in claim 6 wherein said conveying element is an auger having a plurality of flights spaced as substantially equal intervals from one another, and wherein said regulating means further comprises a gear having a plurality of teeth in mesh with said flights of said auger such that movement of said auger causes said gear to rotate and causes said teeth to enter and to exit the space between said flights and to thereby positively displace feed from between said flights such that the mount of feed carried by said auger may be reduced to an amount less than the volume of feed carried by said auger when said auger is filled with feed across its full cross section.

8. In a feed system as set forth in claim 5 wherein said regulating means comprises a regulating tube within said feed outlet having a diameter smaller than the diameter of said conveyor tube and only somewhat greater than the diameter of said auger so as to regulate the amount of feed carried by said auger and to insure that said partial void is provided in said conveyor tube downstream from said regulating tube.

9. In a feed system as set forth in claim 5 wherein said regulating means comprises both a regulating tube within said feed outlet having a diameter smaller than the diameter of said conveyor tube and only somewhat greater than the diameter of said auger so as to regulate the amount of feed carried by said auger and to insure that said partial void is provided in said conveyor tube downstream from said regulating tube, and a gear having a plurality of teeth in mesh with said flights of said auger such that movement of said auger causes said gear to rotate and causes said teeth to enter and to exit the space between said flights and to thereby positively displace feed from between said flights such that as said feed carried by said auger enters said conveyor tube said partial void is formed.

* * * * *